Oct. 12, 1971  R. S. FIELD  3,611,615

FISH LURE

Filed Aug. 26, 1968

INVENTOR
REX S. FIELD
BY
Fetherstonhaugh & Co
ATTORNEYS

United States Patent Office 3,611,615
Patented Oct. 12, 1971

3,611,615
FISH LURE
Rex S. Field, P.O. Box 892, Courtenay,
British Columbia, Canada
Filed Aug. 26, 1968, Ser. No. 755,129
Int. Cl. A01k 85/00
U.S. Cl. 43—42.36                    12 Claims

ABSTRACT OF THE DISCLOSURE

A fish lure having a slender elongated body which will sink in water and which is larger in thickness and width at its longitudinal center than at its ends. The body tapers symmetrically from the longitudinal center toward the ends and is substantially diamond-shaped in cross section at any transverse plane thereof.

BACKGROUND OF THE INVENTION

This invention relates to lures to be used in catching fish.

There are a great many fish lures on the market, and these have various degrees of success. However, there are many occasions when the known lures are used in areas where fish are, and yet few fish, if any, are caught. Some lures are reasonably successful with certain types of fish or under certain conditions, but are unsuccessful with other types or under different conditions. Some lures have hooks attached to them, and a fish caught on one of the hooks can lever or pry against the lure to tear out the hook. With most known lures, the line becomes slack, enabling the caught fish to shake out the hook. A further disadvantage results from the fact that some hooks are connected to the lures by short leaders, and when the line is cast, the hook sometimes get caught on the line, rendering the lure and hook combination useless until the line is reeled in and the hook released.

SUMMARY OF THE INVENTION

A fish lure according to the present invention is successful with practically all types of fish, and under all fishing conditions. This is the result of a study that has been made to try to ascertain what actually lures a fish. It was noticed that when a herring is mortally wounded, such as when it is caught in the mouth of a larger fish, but manages to wiggle free, in usually sinks in a substantially horizontal position and spins around its longitudinal axis on the way down. It was also noticed that when this happens, fish from far and near immediately make for the herring. It was deduced from this that the rotating herring must send out vibrations which are recognized by the fish as emanating from a mortally-wounded fish.

The present lure is the result of much time and effort in arriving at a design which would function in the same manner as a mortally-wounded herring as it moves downwardly through the water. The present lure remains in a substantially horizontal position and rotates around its longitudinal axis as it moves downwardly through the water. This appears to produce the same type of vibration as the herring, and fish from far and near are immediately attracted to it. Experiments have been conducted to prove that the fish do not necessarily see the herring or lure. This lure has been placed in the water behind an opaque sheet, and fish on the other side of the sheet swam around the latter or swam into it trying to get to the falling lure.

A lure according to the present invention comprises a slender elongated body that will sink in water, the body being larger at its longitudinal centre than at its ends and tapering symmetrically towards the ends. The body is wider at any transverse plane throughout the length thereof than its thickness midway between the side edges at this plane.

A hook may be directly connected to an end of the body or connected thereto through a swivel, and a line may be directly connected to the opposite end of the body or connected to said opposite end through a swivel, but it is preferable to provide the body with a central passage extending longitudinally therethrough from end to end thereof through which a fishing line can be threaded. The hook is tied to the free end of the line near the body. This allows the body to move longitudinally along the line. When the line is cast, the body moves along the line to the end thereof at the hook so that the hook cannot loop back and catch on the main portion of the line at this time. When a fish is caught on the hook, it usually pulls the latter away from the lure body so that it cannot lever against the latter in an effort to pry out the hook. Furthermore, the comparatively heavy body being on the line keeps the latter tight so that there is no slack in it as the fish tries to get off the hook.

DESCRIPTION OF THE PREFERRED EMBODIMENTS

Figure 1:
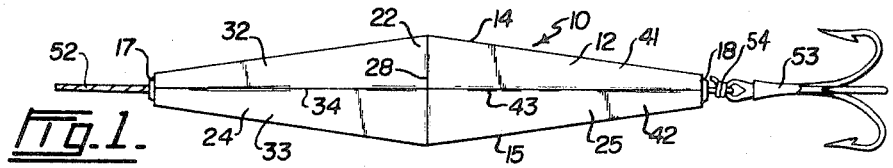
FIG. 1 is a plan view of this fish lure.

Referring to the drawings, 10 is a fish lure comprising a slender elongated body 12 which is heavy enough to sink in water. Actually, it is preferable that this body be relatively heavy, and it is preferably, although not necessarily, formed of lead, lead alloy, or the like.

Body 12 has side edges 14 and 15 extending between its ends 17 and 18. This body is larger at its longitudinal centre, as indicated at 22, than its ends 17 and 18, and tapers symmetrically towards said ends so that the body is formed with forwardly and rearwardly inwardly tapering sections 24 and 25.

Figure 2:
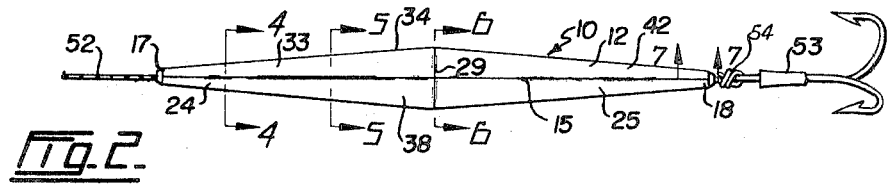
FIG. 2 is a side view of the lure.
Figure 4:
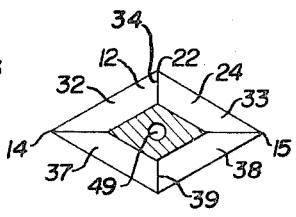
FIGS. 4, 5 and 6 are enlarged cross sections through the lure taken respectively on lines 4—4, 5—5, and 6—6 of FIG. 2.
Figure 5:
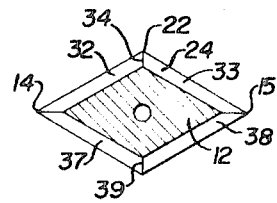
Figure 6:
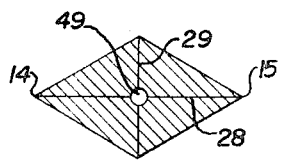

By referring to FIGS. 1 and 2, it will be seen that the body of illustrated lure 10 is wider at its central section 22, indicated by line 28 in FIG. 1, than its thickness at said section, indicated by line 29 in FIG. 2. By referring to FIGS. 4 to 6, it will be seen that in each case the body is wider than its central thickness at the respective section planes. This preferably applies to the body throughout the length thereof. In other words, the body is preferably wider at any transverse plane throughout the length thereof than its thickness substantially midway between the side edges at said plane. By referring to FIGS. 4 and 5, it will also be seen that body 12 is substantially diamond-shaped in cross section, and end section 24 is formed with upper surfaces 32 and 33 which are inclined downwardly from a central longitudinal ridge 34 to side edges 14 and 15. Similarly, the lower surface of said section 24 is formed with upwardly inclined surfaces 37 and 38 inclined from a central longitudinal ridge 39 to side edges 14 and 15. Rear section 25 of body 12 is formed with similarly inclined upper and lower surfaces, upper surfaces 41 and 42, and upper ridge 43 being shown in FIGS. 1 and 2. It also will be noted from FIGS. 4 to 6 that side edges 14 and 15 are thin and knife-like. Although not absolutely necessary, it is preferable to make the edges as thin as possible.

Figure 3:
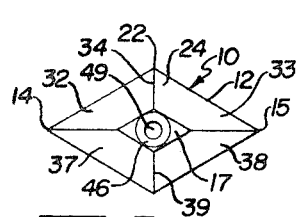
FIG. 3 is an enlarged end elevation of the lure.
Figure 7:
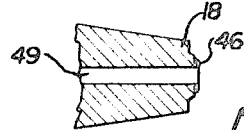
FIG. 7 is an enlarged fragmentary longitudinal section taken on the line 7—7 of FIG. 2.

Although ends 17 and 18 may be substantially points or just blunt ends, they are preferably made circular and rolled back to form an annular rim 46, ends 17 and 18 being shown respectively in FIGS. 3 and 7 formed in this manner.

Lure body 12 is preferably formed with a central passage 49 extending longitudinally from end to end thereof. This passage is just large enough in cross section to permit a fishing line to be threaded therethrough. It is preferable that body 12 be balanced around this passage.

In FIGS. 1 and 2, a fishing line 52 is threaded through passage 49 of lure body 12, and a suitable fish hook 53 is tied at 54 to the free end of this line. It is preferable to leave the body free to move along the line, although it can be retained against the hook in any suitable manner, such as by means of a knot in the line. Line 52 extends to the reel of a fishing rod, not shown.

In order to fish with this lure, the fisherman casts the line outwardly so as to have hook 53 enter the water as far away from him as possible. The weight of lure body 12 greatly assists this operation. When the line is cast, the weight of body 12 keeps it against the hook so that the latter always moves outwardly ahead of the lure and cannot get caught on the main part of line 52. If a fish strikes hook 53 and is caught thereon, as it swims away, the lure usually slides along the line away from the fish to some extent at least. As a result of this, as the fish thrashes about, it does not engage anything solid against which it can lever to tear out the hook. Furthermore, the weight of the lure body keeps the line from becoming slack at any time during the thrashings or gyrations of the fish.

Figure 8:
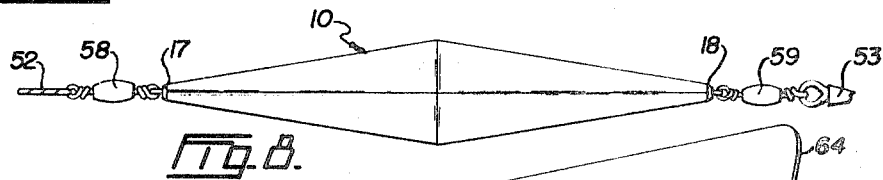
FIG. 8 is a view similar to FIG. 1, illustrating an alternative way of connecting the lure to a fishing line and a hook.

FIG. 8 merely shows an alternative way of connecting lure 10 to line 52 and hook 53. Line 52 can be directly connected to end 17 of the lure in any suitable manner, but if this arrangement is to be used, it is preferable to connect the line to a swivel 58 and the latter to the lure end. Similarly, hook 53 can be directly connected to end 18 of the lure, but it is preferable to connect it thereto through a swivel 59. If desired, hook 53 can be tied to a short leader and the latter connected to end 18 of the lure.

Figure 9:
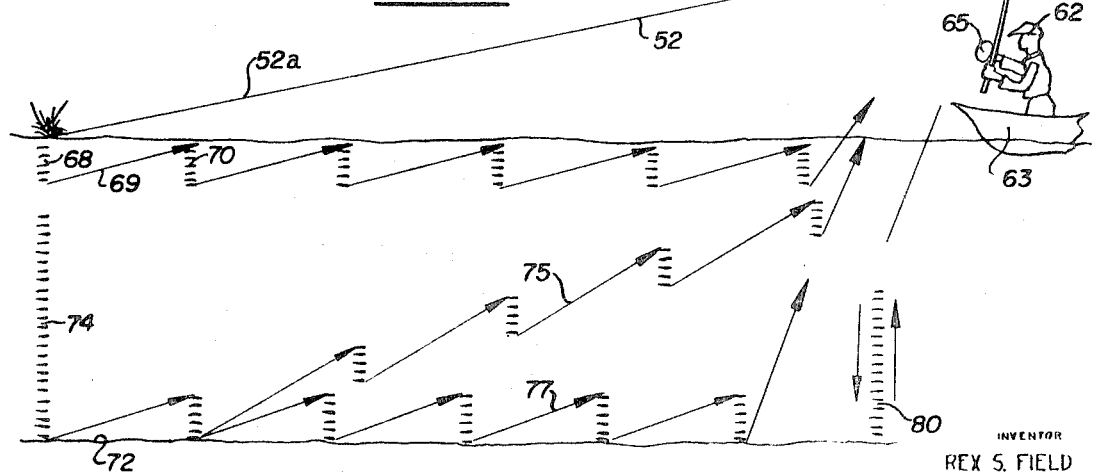
FIG. 9 is a diagrammatic view, illustrating the technique of fishing with this lure at different levels in the water.

FIG. 9 illustrates the way to fish with lure 10. A fisherman 62 is illustrated in a boat 63 with a fishing rod 64 having a reel 65 upon which line 52 is wound. The fisherman casts lure 10 with its hook as far away from the boat as possible, this being illustrated by line 52a. Lure 10 is allowed to sink in the water as far down as it is desired to fish. At this time, lure 10 remains substantially horizontal but rotates around its longitudinal axis and falls downwardly in the water as indicated at 68. During this time, the fisherman has his rod extended outwardly towards the lure. He then raises the rod and draws it in over his head, drawing lure 10 through the water as indicated at 69. He then moves the rod towards the lure which leaves his line slack, at which time the lure moves downwardly in the water while rotating around its longitudinal axis, as indicated at 70. These steps are continued until the lure gets close to the boat, and then the entire operation is repeated. The depth at which the lure falls each time the line is slackened will depend upon how long the lure is allowed to move downwardly in the water. Each time the line is slackened, the fisherman will take up the slack on his reel 65.

If the fisherman wishes to fish from the bottom 72 of the water at all levels, when he casts the lure outwardly, he will allow it to move down to the bottom, as indicated at 74. He will then repeat his alternate reeling in and slackening of the line. Each time he reels in the line, he will try to draw the lure upwardly a little farther from the bottom than the last time, and he will only allow it to float downwardly a little each time this is done so that the lure gradually moves upwardly through the water as it travels towards the boat, as indicated at 75.

If the fisherman desires to fish along the bottom of the water, he would alternately reel in and slacken his line to obtain the effect indicated at 77.

If it is desired to fish near the bottom and below the boat, the lure can be dropped to the bottom of the water near the boat, then alternately raised above the bottom and allowed to float downwardly thereto while it rotates around its longitudinal axis, as indicated at 80.

As stated above, when the fishing line is slackened, the lure starts to sink, but remains substantially horizontal and rotates around its longitudinal axis. This apparently sets up vibrations in the water that attract fish, imitating vibrations of a mortally-wounded herring. Evidently all kinds of fish are attracted to a mortally-wounded fish, whereas many do not seem to bother with a healthy one or one that is just wounded.

I claim:

1. A fish lure comprising a slender elongated body that will sink in water and having side edges extending between ends thereof, said body having a central axis extending from end to end thereof, said body being larger at its longitudinal centre than at any other point throughout the length thereof and tapering symmetrically towards the ends, said body being wider in a horizontal plane passing through said axis and at any transverse plane throughout the length thereof than its thickness substantially midway between the side edges at said any transverse plane, and said body being substantially diamond-shaped in cross section at any transverse plane thereof, whereby said body when the lure is in use remains in a substantially horizontal position and rotates around said central axis as the body moves freely downwardly through the water.

2. A fish lure as claimed in claim 1 in which said body has a central passage extending therethrough from end to end thereof, and coinciding with said central axis said passage being large enough in cross section to permit a fishing line to be threaded therethrough.

3. A fish lure as claimed in claim 1 in which the body is relatively heavy as compared to the size thereof.

4. A fish lure as claimed in claim 1 in which each end of the body is substantially circular and is rolled back to form an annular rim around said end.

5. A fish lure comprising a slender elongated body that will sink in water and having upper and lower surfaces and side edges extending between relatively small ends of the body, said body having a central axis extending from end to end thereof, said body being larger in width and thickness at its longitudinal centre than at said ends and tapering symmetrically in width and thickness towards the ends, said body being wider in a horizontal plane passing through said axis and at any transverse plane throughout the length thereof than its thickness substantially midway between the side edges at said any transverse plane, and each of said upper and lower surfaces being formed by surfaces inclined from said side edges to a central ridge extending from end to end of the body, whereby said body when the lure is in use remains in a substantially horizontal position and rotates around said central axis as the body moves freely downwardly through the water.

6. A fish lure as claimed in claim 5 in which said body has a central passage extending therethrough from end to end thereof and coinciding with said central axis, said passage being large enough in cross section to permit a fishing line to be threaded therethrough.

7. A fish lure as claimed in claim 5 in which said body has a central passage extending therethrough from end to end thereof and coinciding with said central axis, said passage being large enough in cross section to permit a fishing line to be threaded therethrough.

8. A fish lure as claimed in claim 5 in which said body is substantially diamond-shaped in cross section at any transverse plane thereof.

9. A fish lure as claimed in claim 8 in which said side edges of the body are thin and knife-like.

10. A fish lure comprising a slender elongated body symmetrically formed around a longitudinal central axis and generally tapering inwardly towards ends of the body, said body being larger in width and thickness at its longitudinal centre than at said ends, and said body being substantially diamond-shaped in cross section at any transverse plane thereof, whereby said body when the lure is in use remains in a substantially horizontal position and rotates around said central axis as the body moves freely downwardly through the water.

11. A fish lure as claimed in claim 10 in which said body tapers inwardly in both horizontal and vertical planes considering the body when the latter is in operative position.

12. A fish lure as claimed in claim 10 in which said body is wider at any transverse plane throughout the length thereof than its thickness substantially midway between side edges thereof at said any plane.

References Cited

UNITED STATES PATENTS

| | | | |
|---|---|---|---|
| 2,187,991 | 1/1940 | Tyler | 43—43.1 |
| 2,473,089 | 6/1949 | Barone | 43—44.9 |
| 3,180,051 | 4/1965 | Freeman | 43—44.91 X |
| 3,460,285 | 8/1969 | Perkins | 43—44.9 |
| 2,239,934 | 4/1941 | Ruiz | 43—43.1 |
| 2,574,293 | 11/1951 | Sabin et al. | 43—42.36 X |
| 2,592,445 | 4/1952 | McCarthy | 43—42.46 X |
| 2,955,380 | 10/1960 | Hulick | 43—42.36 |
| 1,548,662 | 8/1925 | Crawford | 43—42.36 X |
| 1,848,704 | 3/1932 | Farley | 43—42.36 X |
| 1,886,116 | 11/1932 | Nolan | 43—42.48 X |
| 3,024,562 | 3/1962 | Halling | 43—42.48 |

SAMUEL KOREN, Primary Examiner

D. J. LEACH, Assistant Examiner

U.S. Cl. X.R.

43—42.48, 44.9